(12) United States Patent
Marason et al.

(10) Patent No.: US 10,295,721 B1
(45) Date of Patent: May 21, 2019

(54) ADJUSTABLE COLOR TEMPERATURE ILLUMINATION

(71) Applicant: Amazon Technologies, Inc., Reno, NV (US)

(72) Inventors: Eric Gifford Marason, San Francisco, CA (US); Miguel Virgen, Santa Clara, CA (US); Christopher Dwight Barnes, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/058,548

(22) Filed: Mar. 2, 2016

(51) Int. Cl.
| | |
|---|---|
| *G02B 26/00* | (2006.01) |
| *F21V 8/00* | (2006.01) |
| *G02F 1/167* | (2019.01) |
| *G02F 1/13357* | (2006.01) |
| *F21W 131/30* | (2006.01) |
| *G02F 1/1335* | (2006.01) |

(52) U.S. Cl.
CPC ......... *G02B 6/0026* (2013.01); *G02B 6/0065* (2013.01); *G02F 1/1336* (2013.01); *G02F 1/167* (2013.01); *F21W 2131/30* (2013.01); *G02F 2001/133616* (2013.01)

(58) Field of Classification Search
CPC ...... G02B 6/122; G02B 6/004; G02B 6/0073; G02B 26/026; G09G 3/344; G02F 1/167
USPC .................................................. 359/290–297
See application file for complete search history.

(56) References Cited

U.S. PATENT DOCUMENTS

| | | | |
|---|---|---|---|
| 9,441,801 B1* | 9/2016 | Myers ........................ | F21S 8/04 |
| 2010/0321418 A1* | 12/2010 | Hayashi ............ | G02F 1/133603 |
| | | | 345/690 |
| 2014/0253562 A1* | 9/2014 | Yaras ..................... | G09G 3/342 |
| | | | 345/501 |
| 2015/0301407 A1* | 10/2015 | Chan ................ | G02F 1/133603 |
| | | | 349/64 |

* cited by examiner

*Primary Examiner* — Mahidere S Sahle
(74) *Attorney, Agent, or Firm* — Hogan Lovells US LLP

(57) ABSTRACT

Various approaches discussed herein enable techniques for adjusting color temperature value of illumination, for example with regard to electrophoretic ink display screens. A plurality of one type of LEDs are positioned along an injection line of a light guide panel, and are interleaved with a plurality of another type of LED positioned along the injection line. By controlling the current supplied to each group of LEDs, a color temperature value of light directed onto a display screen from the light guide panel may be adjusted to remove or reduce blue aspects.

18 Claims, 10 Drawing Sheets

500

ADJUSTABLE COLOR TEMPERATURE ILLUMINATION

BACKGROUND

As the popularity of mobile devices continues to increase, people use devices more during the night. Some mobile devices offer an illumination display scheme for the display that utilizes light emitting diodes (LEDs) to accentuate ambient light or as a sole source of illumination for the display. Especially in the evening when a user's pupils may be dilated, the blue color components of the light provided by the LEDs may be perceived as harsh, and may have negative effects, such as interfering with a user's normal sleep patterns.

BRIEF DESCRIPTION OF THE DRAWINGS

Various embodiments in accordance with the present disclosure will be described with reference to the drawings, in which.

DETAILED DESCRIPTION

Figure 1:
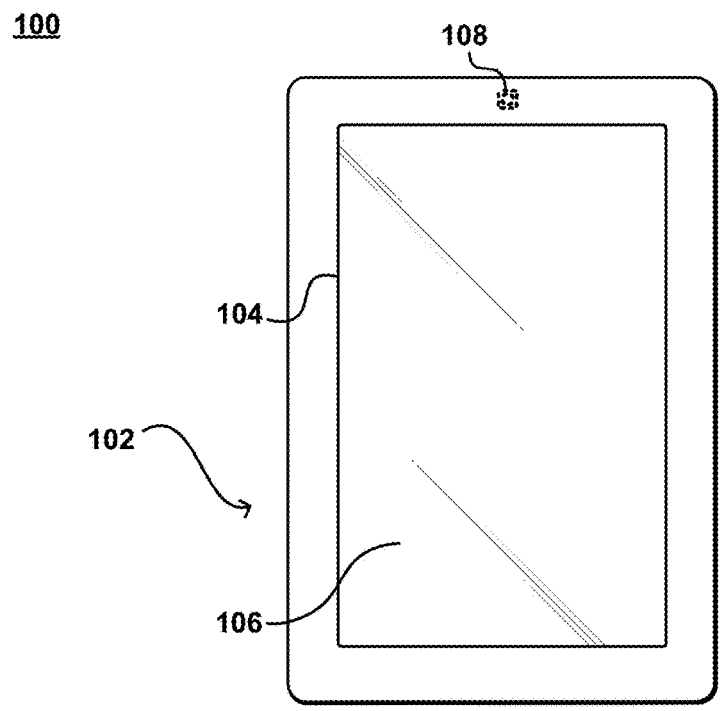
FIG. 1 illustrates a top view of a computing device with a display, in accordance with various embodiments.

Systems, devices and methods in accordance with various embodiments of the present disclosure may overcome one or more of the aforementioned and other deficiencies experienced in conventional approaches for adjustable color temperature illumination. In particular, various embodiments enable a device, such as a device using a reflective display (e.g., an electrophoretic ink display) and a frontlight ambient illumination scheme, to adjust the color temperature value of the frontlight illumination, for example to lower the color temperature value of the light presented to the user, thereby changing the light from a bluish-white color to a more yellow color. While an electrophoretic ink display is referred to herein, it should be understood that any type of black-and white, grayscale, or color reflective display technology, for example where light is reflected from above rather than directed from below, may be utilized in various implementations of the approaches described herein.

For example, e-readers using an electrophoretic ink display screen are widely used to read books and other content. During the day, when ambient illumination is often plentiful, there is no need for additional illumination, such as that provided by a frontlight illumination scheme, for example. When ambient illumination is insufficient, such as at night or in a darkened room, additional illumination may be provided by light emitting diodes (LEDs). Current approaches to LED illumination often utilize LEDs that emit bluish-white light containing a significant blue color component, with a color temperature value of approximately 6500 Kelvin (K) or higher. As discussed further herein, 6500 K is one example of an approximate color temperature value of bluish-white light emitted by an example LED embodiment. While this color light may be sufficient for daytime situations, the blue light can be perceived as harsh in less-lit surroundings. Additionally, significant negative effects may result from exposure to blue light in various situations. For example, at night, the blue component of the current LED light approaches may inhibit melatonin production and/or synthesis, which can affect sleep patterns.

An example approach to ameliorating the potential negative effects of lighting schemes using light with a significant blue component is to adjust the color being emitted from one or more of the particular lighting component(s); for example, by reducing the color temperature value from the aforementioned approximately 6500 K to a lower temperature having a more yellow/yellowish-white aspect, such as light having a wavelength of about 580-585 nanometers (nm), which may be achieved at a color temperature value at approximately 2500 K. However, current approaches such as reducing the current to the LEDs cannot achieve reduction of the blue component. Additionally, with some displays, such as electrophoretic ink display screens, individual pixels cannot be controlled or otherwise adjusted to achieve a reduction in the overall color temperature value of a display.

Accordingly, approaches in accordance with various embodiments improve the operation and performance of computing devices, such as those on which they are implemented by, among other advantages, offering an adjustment of the color of light used in various reflective display approaches, offering a user more options that would otherwise not be available, and enhancing the functionality of the device (e.g., offering a wider range of colors and/or color temperature values used in the display, without significant modification or cost, etc.). Various other applications, processes, and uses are presented below with respect to the various embodiments, each of which improves the operation and performance of the computing device(s) on which they are implemented.

Various approaches discussed herein enable adjustable color temperature illumination by positioning a first set of "frontlight" illuminating elements, such as LEDs that emit bluish-white light (e.g., LEDs with a yttrium aluminum garnet (YAG) phosphor, etc.) that emit bluish-white light of a particular color temperature value (e.g., approximately 6500 K), at an edge of a light guide panel so that the light emitted by the LEDs that emit bluish-white light enters the light guide panel and is subsequently directed onto a display screen, such as an electrophoretic ink display screen. According to an embodiment, a second set of frontlight illuminating elements (e.g., dual phosphor LEDs with red, green, and blue (RGB) components, additional LEDs that emit bluish-white light with a YAG phosphor, etc.) are positioned at the same edge of the light guide panel, and the light emitted by second set of LEDs is filtered through a filter element (e.g., an optical filter) to result in a yellow/yellowish-white light, for example by preventing the transmission of some or all of other light wavelengths such as blue (e.g., light having a wavelength between 450 nm and 495 nm) and green from the light. In various embodiments, the filter may be a particular type of filter, such as a long bandpass absorption filter, positioned between the second set of LEDs and the light guide panel, resulting in the combined light (i.e., the light from the LEDs that emit bluish-white light and the filtered light from the second set of LEDs that is combined within the light guide panel) emitted into the light guide panel by the LEDs and then directed onto a display from the light guide panel having a combined color temperature value lower than the LEDs that emit bluish-white light. The light from the LEDs that emit bluish-white light combines in the light guide panel with the filtered light from the second set of LEDs and is directed from the light guide panel onto a display screen, with the color temperature value of the light directed onto the screen having a lower temperature value (i.e., less bluish-white and more yellow/yellowish white). According to various embodiments, the first and second sets of LEDs may be the same type of LED and/or produce the same color of light (e.g., bluish-white), utilizing a filter element on one or more LEDs to adjust the combined light to have a yellow/yellowish-white color, while other embodiments may have two or more different types of LEDs (e.g., those that emit bluish-white light and those that emit yellow/yellow-ish white light), and an adjustment of current directed to one or more of the different types of LEDs operates to generate combined light having a yellow/yellowish-white color emitted into the light guide panel.

According to various embodiments, the LEDs that emit bluish-white light are positioned along the same edge of the light guide panel as the second set of LEDs in an interleaved pattern. For example, there may be one bluish-white LED placed between two of the second set of LEDs, and this pattern may be utilized for as many LEDs as are positioned in the device. In additional embodiments, a "flashlight effect" of the light entering the light guide panel from several LEDs may result in uneven illumination, so one or more LEDs of varying types may be placed closer together so they functionally operate as a single LED, resulting in a more even illumination. Similarly, one or more LEDs of varying types may be placed further away from the light guide panel, offering more room for the light to spread out and evenly illuminate the display.

In other embodiments, LEDs that emit bluish-white light may be utilized along with red and/or green LEDs to adjust color temperature illumination of a display screen, with or without a filter element (e.g., an optical filter, etc.) utilized with regard to the red and green LEDs. Various interleaving arrangements of the LEDs that emit bluish-white light may be made with regard to the red and green LEDs; for example, the red and green LEDs may be arranged side-by-side, and each group of a red LED and a green LED may be placed between two LEDs that emit bluish-white light.

According to various embodiments, techniques may result in the LEDs that emit bluish-white light emitting light of a higher color temperature value (i.e., having more blue components) into the light guide panel, for example to offer a wider range of potential color temperature values of light directed from the light guide panel. For example, a filter element (e.g., a short bandpass absorption filter operating to prevent transmission of wavelengths of light other than blue) may be positioned between one or more of the LEDs that emit bluish-white light and the light guide panel to adjust the color temperature value of the light entering the light guide panel. According to another approach, the selection of LEDs that emit bluish-white light may be made from a group of potential LEDs that emit bluish-white light having a higher color temperature value.

According to various embodiments, various filter elements may be utilized to modify the color temperature value of light emitted from one or more LEDs, and the arrangement of the filter elements may be performed in various ways. For example, a filter strip may be provided that holds filter elements in a certain position relative to the LEDs, or the filter elements may be formed into the filter strip. A single filter strip may hold or comprise one or more different filter elements and/or types of filter elements, with the filter elements being arranged in an interleaving or other pattern that matches the LED arrangement. One filter strip may be attached to the edge of the light guide panel into which the light is emitted, or may be attached to an exit surface of one or more LEDs (i.e., the side of the LEDs that faces the light guide panel). Multiple filter strips may be utilized in various embodiments, each holding one or more filter elements of varying types in an arrangement matching the LED arrangement, and the filter strips being positioned in various locations, such as one filter strip containing one type of filter element being attached to the edge of the light guide panel and one filter strip containing another type of filter element being attached to an exit surface of the LEDs. The filter strips may have openings or clear elements to allow light from LEDs that are not to be filtered by the particular filter element type held by the filter strip to be emitted without modification.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1 illustrates a front view 100 of an example computing device with a display, in accordance with various embodiments. As illustrated in FIG. 1, the example computing device 102 includes a camera 108, a display screen 104, and a light guide 106. According to various embodiments, the display screen 104 may be a reflective display such as an electrophoretic ink display screen, in black and white, grayscale, or color, which mimics the appearance of ordinary ink on paper. In various examples, an electrophoretic ink display screen comprises microcapsules that contain black and white pigment chips floating in a substance such as oil. The white pigments are positively charged, and the black are negatively charged. An electric field under these microcapsules is positively or negatively charged, attracting or repelling the pigments to make the microcapsule appear while, black, or grey.

Various embodiments of electrophoretic ink display screens may not use a backlight; instead, ambient light is reflected from the surface of the display back to the eyes of a viewer. As such, when ambient light is insufficient, compensatory illumination techniques have been developed, such as various frontlight techniques, such as those that use a thin light guide material coupled to the display screen, which uniformly disperse light emitted into the light guide over the entire display screen (e.g., a front-lit display element). As will be discussed with respect to FIG. 2, a light source used to provide light for the front-lit display comprises various types of LEDs arranged in various patterns, according to particular embodiments.

Figure 2:
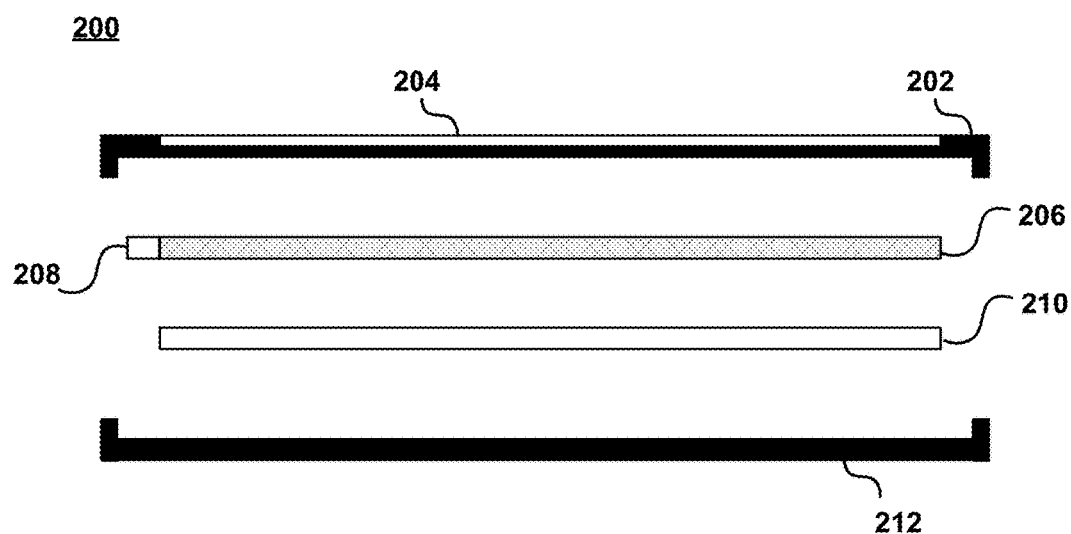
FIG. 2 illustrates a side exploded view of portions of a computing device with a display, in accordance with various embodiments.

FIG. 2 illustrates a side exploded view 200 of portions of a computing device with a front-lit display, in accordance with various embodiments. An example device utilizing the techniques herein may be comprised of numerous components, a subset of which is illustrated in FIG. 2. A front housing 202 and rear housing 212 provide support and an enclosure for the internal components of the device. Additional components than those illustrated in FIG. 2 may be coupled or other connected to either the front housing 202 or rear housing 212; for example, electronic circuitry, battery components, networking components, processing components, etc.

In the example illustrated in FIG. 2, the front housing 202 has an opening 204 disposed within the housing 202, for example to provide visibility for the display screen 210. In various embodiments, the display screen 210 is an electrophoretic ink display screen, as discussed further herein, although the techniques described in the present specification are not limited to one particular type of display technology.

According to various embodiments, a light guide panel 206 and an illumination source 208 are provided. As will be discussed further herein, the illumination source 208 in various embodiments is coupled to the light guide panel 206 and contains one or more LEDs of varying kinds (e.g., type, size, composition, color, color temperature value, etc.), positioned in various interleaving patterns in relation to each other and the light guide panel 208, and emitting light into one or more filter elements in various embodiments prior to the light being received by the light guide panel 208.

The light guide panel 206 may in various embodiments comprise a substrate that is operable to propagate light received from the illumination source 208 and emit the received light towards the display screen 210, thereby illuminating the display screen, for example after the light has been internally reflected and/or scattered within the light guide panel 208. The light guide panel 206 may be optically and/or mechanically coupled to the illumination source 208, such that light emitted by the illumination source 208 enters an edge of the light guide panel 206 (e.g., an "injection line"). Light from the illumination source 208 travels along the plane of the light guide panel 208, and is internally reflected and/or scattered over the various surfaces (e.g., top, bottom, sides) of the light guide panel 208, for example by bouncing off of or otherwise contacting scattering features formed within the light guide panel 208. In various embodiments, the scattering features become denser the farther away they are from the injection line, and serve to maintain an uniformity to the light that flows through the light guide panel 206 and ultimately is directed towards the display screen 210.

Figure 3A:
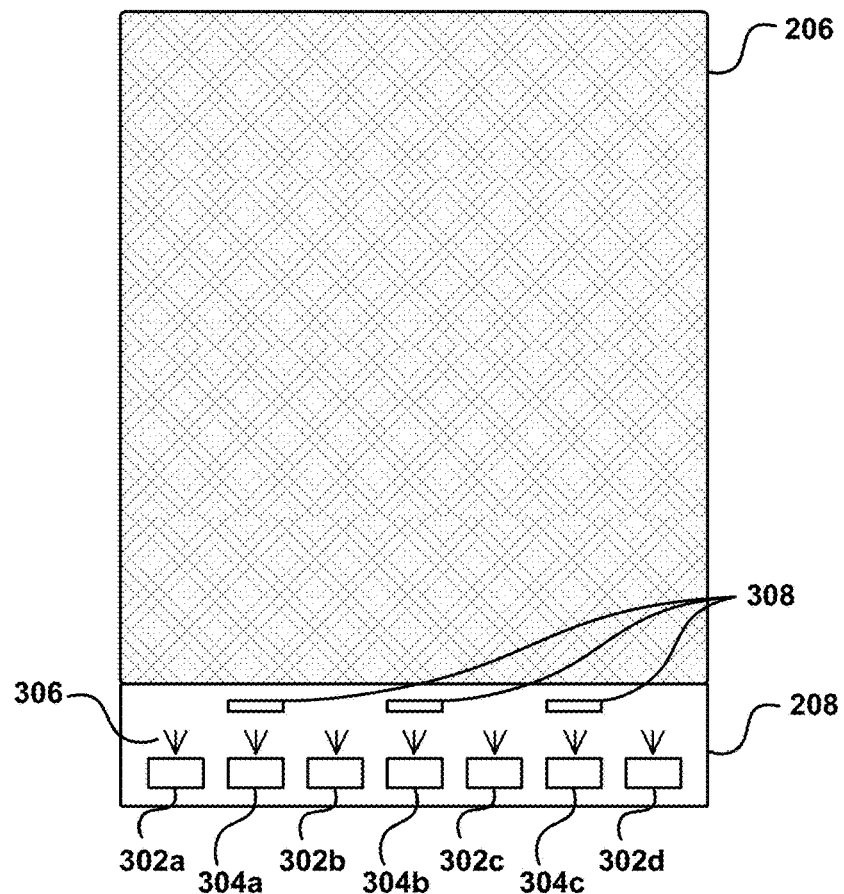
FIGS. 3A-3B illustrate top views of example component arrangements for adjustable color temperature illumination, in accordance with various embodiments.
Figure 3B:
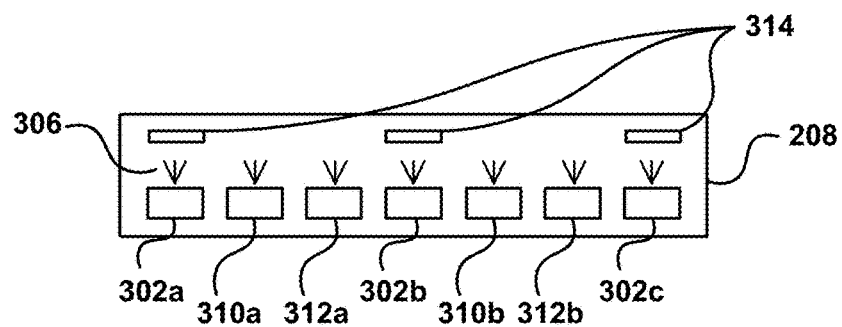

FIGS. 3A and 3B illustrate top views 300, 320 of example component arrangements for adjustable color temperature illumination, in accordance with various embodiments. It should be understood that reference numbers may be carried over between figures for similar components for purposes of explanation, but that such use should not be interpreted as a limitation on the various embodiments. In FIG. 3A, a light guide panel 206 is illustrated that is coupled to an illumination source 208 comprised of a plurality of LEDs 302a-302d, 304a-304c that are emitting light 306 into the light guide panel 206 along the injection line (e.g., a common edge).

According to an embodiment, a plurality of LEDs 302a-302d, 304a-304c are positioned at a common edge of the light guide panel 206 and are operable to emit light 306 into the light guide panel 206. In various embodiments, the plurality of LEDs 302a-302d, 304a-304c are comprised of one or more groups or sets, in example embodiments the LEDs comprising each group or set having different color and/or color temperature characteristics (e.g., values) of the light emitted therefrom. For example, in FIG. 3A, there are two sets of LEDs. One set 302a-302d may comprise LEDs that emit bluish-white light. Examples of these LEDs may include LEDs with a yttrium aluminum garnet (YAG) phosphor. The other set 304a-304c may comprise LEDs having a different composition, such as a dual phosphor LED with red, green, and blue (RGB) components; however, according to various embodiments, the other set 304a-304c may have the same composition as the first set 302a-302d, or may emit light of a different color and/or having a different color temperature value (e.g., yellow/yellowish-white light). While LEDs of varying types are discussed with regard to the techniques described herein, it should be understood that the techniques described herein may be utilized with numerous types of illuminating elements, including but not limited to LEDs. The two sets of LEDs illustrated in FIG. 3A are arranged in a particular interleaving pattern (e.g., YAG phosphor LED—dual phosphor LED, bluish-white LED—yellow/yellowish-white LED, and so forth), although various patterns may be utilized.

According to various embodiments, the set of LEDs that emit bluish-white light 302a-302d emit light of a particular color temperature value (e.g., approximately 6500 K). The other set of LEDs 304a-304c may emit light having a similar color temperature value, however, in various embodiments including the example embodiment illustrated in FIG. 3A, a filter element 308 is positioned between the other set of LEDs 304a-304c. One example of the filter element 308 is a long bandpass absorption filter that operates to filter out certain wavelengths of light (e.g., light having a wavelength between 450 nm and 495 nm, etc.) from the light emitted 306 by the other set of LEDs 304a-304c. In various embodiments, varying kinds of filters are utilized. For example, instead of a bandpass filter, a band-stop filter such as a notch filter may be used. Instead of an absorption filter, a dichroic filter may be used. As a result, the light received by the light guide panel 206 after being filtered by the filter elements 308 has a lower color temperature value (e.g., is more yellow/yellowish-white) than the light received by the light guide panel 206 that is emitted by the bluish-white set of LEDs 302a-302d. As a result, the light received by the light guide panel 206 from both sets of LEDs 302a-302d, 304a-304c forms combined light in the light guide panel 206 that has a combined color temperature value that is between the color temperature value of the LEDs that emit bluish-white light 302a-302d and the filtered set of LEDs 304a-304c, the combined light being directed towards the display screen (not illustrated in FIGS. 3A-3B) as described earlier. According to various embodiments, by independently controlling current to each set of LEDs, as described more fully herein, a particular desired color temperature value of the combined light may be achieved. By reducing the color temperature value of the light directed towards the display screen (e.g., making the light more yellow/yellowish-white than bluish-white), the blue component of the light may be reduced or removed, thereby addressing the shortcomings of the current approaches described earlier.

In the example 320 of FIG. 3B, the light guide panel 206 from FIG. 3A is omitted for clarity. FIG. 3B illustrates an example embodiment of the illumination source 208 having a different combination of LED types, interleaving pattern, and filter type and placement that that illustrated in FIG. 3A. In the example 320 of FIG. 3B, three sets of LEDs 302a-302c, 310a-310b, 312a-312b are positioned at a common edge of the light guide panel (not pictured) and are operable to emit light 306 into the light guide panel. In FIG. 3B, one set of LEDs 302a-302c comprises LEDs that emit bluish-white light, while another set 310a-310b comprises red LEDs, and the remaining set 312a-312b comprises green LEDs. As with the example illustrated by FIG. 3A, the set of LEDs 302a-302c having LEDs that emit bluish-white light emits light of a particular color temperature value (e.g., approximately 6500 K), while the set 310a-310b having red LEDs and the set 312a-312b having green LEDs emit light at a lower temperature, and by controlling current directed to each set of LEDs, a combined color temperature value of the combined light may be achieved.

In the example embodiment of FIG. 3B, a set of filter elements 314 is positioned between the set of LEDs 302a-302c having LEDs that emit bluish-white light. In an embodiment, the filter elements are short bandpass absorption filters that are operable to prevent transmission of light wavelengths other than those corresponding to blue light; however, as described earlier, various types of filter elements may be utilized in various embodiments. By raising the amount of blue light emitted into the light guide panel (e.g., to approximately 10,000 K, although various temperatures are envisioned), a greater range of combined color temperature values may be achieved in the light guide panel, for example to compensate for a quality control issue related to the light emitted from one or more LEDs (e.g., the light is more yellow/yellowish-white than bluish-white, etc.).

Figure 4A:
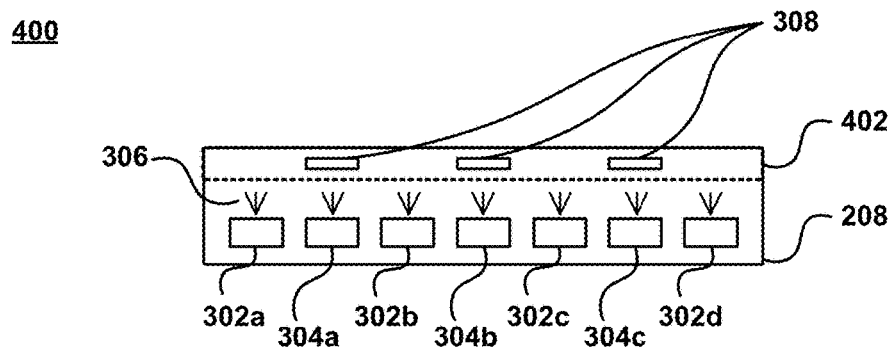
FIGS. 4A-4C illustrate top views of example LED and filter element arrangements for adjustable color temperature illumination, in accordance with various embodiments.
Figure 4B:
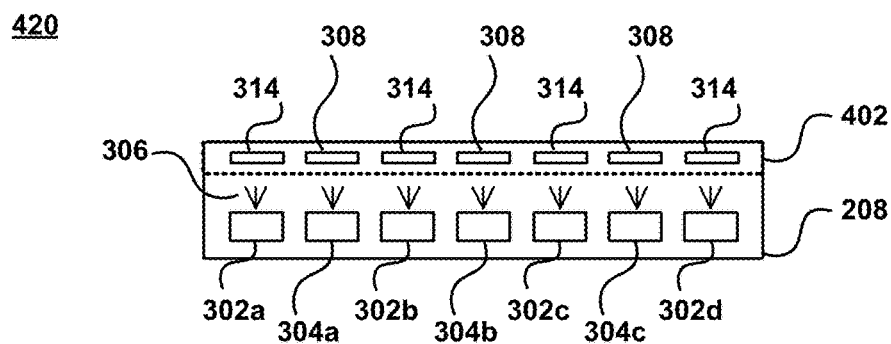
Figure 4C:
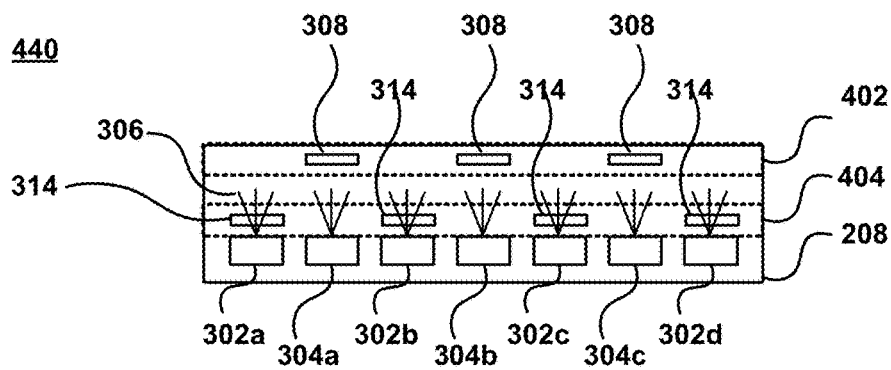

FIGS. 4A-4C illustrate top views of example LED and filter element arrangements for adjustable color temperature illumination, in accordance with various embodiments. In the example 400 of FIG. 4A, the illumination source 208 is made up of two sets of LEDs emitting light 306 into the light guide panel (not pictured): one set of LEDs that emit bluish-white light 302a-302d and one set of LEDs of a different type 304a-304c. As discussed with regard to FIG. 3A, a filter element 308 is positioned between each of the LEDs making up the set of different type LEDs 304a-304c. In the example of FIG. 4A, the filter elements 308 are positioned on a filter strip 402, which is attached to the injection line of the light guide panel (not pictured), for example by adhesive or other technique. In various embodiments, the filter strip 402 may have notches or other receiving elements into which the filter elements 308 are positioned, such that the LEDs that are not intended to be filtered (e.g., the set of LEDs that emit bluish-white light 302a-302d) may emit light into the light guide panel without the emitted light being filtered. The filter strip 402 may have notches (or other type of receiving element) that line up with each LED, but are only populated with filter elements 308 in the notches that line up with the LEDs desired to be filtered.

In the example embodiment 420 of FIG. 4B, a filter strip 402 is illustrated on which two different types of filter elements 308, 314 are positioned, with one type of filter element being positioned between each LED of the set of LEDs that emit bluish-white light 302a-302d and each LED of the set of different type LEDs 304a-304c. In this example, a filter element 314, such as a short bandpass absorption optical filter, is positioned between each LED of the set of LEDs that emit bluish-white light 302a-302d and another filter element 308, such as a long bandpass absorption optical filter, is positioned between each LED of the set of different type LEDs 304a-304c. As discussed earlier, this adjusts the color temperature value of the light emitted into the light guide panel by each respective set of LEDs, offering a wider range of possible combined color temperature values. According to an embodiment, each set of LEDs 302a-302d, 304a-304c may comprise the same type of LED (e.g., bluish-white), with the particular filter element positioned in front of the LEDs, and in some embodiments along with a particular amount of current directed to each set of LEDs, operating to generate a desired combined light being emitted into the light guide panel. Various combinations of LEDs (e.g., type, composition, brand, color emitted, color temperature value of the emitted light, etc.) may be utilized with various combinations of filter elements to generate a desired combined light being emitted into the light guide panel (e.g., a yellow/yellowish-white light instead of a bluish-white light).

In the example embodiment 440 of FIG. 4C, two filter strips 402, 404 are illustrated on which two different types of filter elements 308, 314 are positioned, respectively. As with FIG. 4B, a particular type of filter element 314 is positioned between each LED of the set of LEDs that emit bluish-white light 302a-302d, and a different type of filter element 308 is positioned between each LED of the set of different type LEDs 304a-304c. In this example embodiment 440, the filter strip 404, on which the particular type of filter element 314 is positioned, is attached to the exit surface of the set of LEDs that emit bluish-white light 302a-302d, resulting in the light emitted from those LEDs being filtered, for example to increase or reduce the color temperature value of the light, depending on the particular embodiment. In various embodiments, the filter strip 404 is also attached to the exit surface of the set of different type LEDs 304a-304c, which are not desired to be filtered by the particular type of filter elements 314. In various approaches, the filter strip 404 may have empty spaces in the locations matching the exit surfaces of the set of different type LEDs 304a-304c, or a clear component, or some other technique, that does not result in the filtering of the light emitted by the set of different type LEDs 304a-304c by any filter element positioned on the filter strip 404 attached to the LED exit surfaces.

Figure 5:
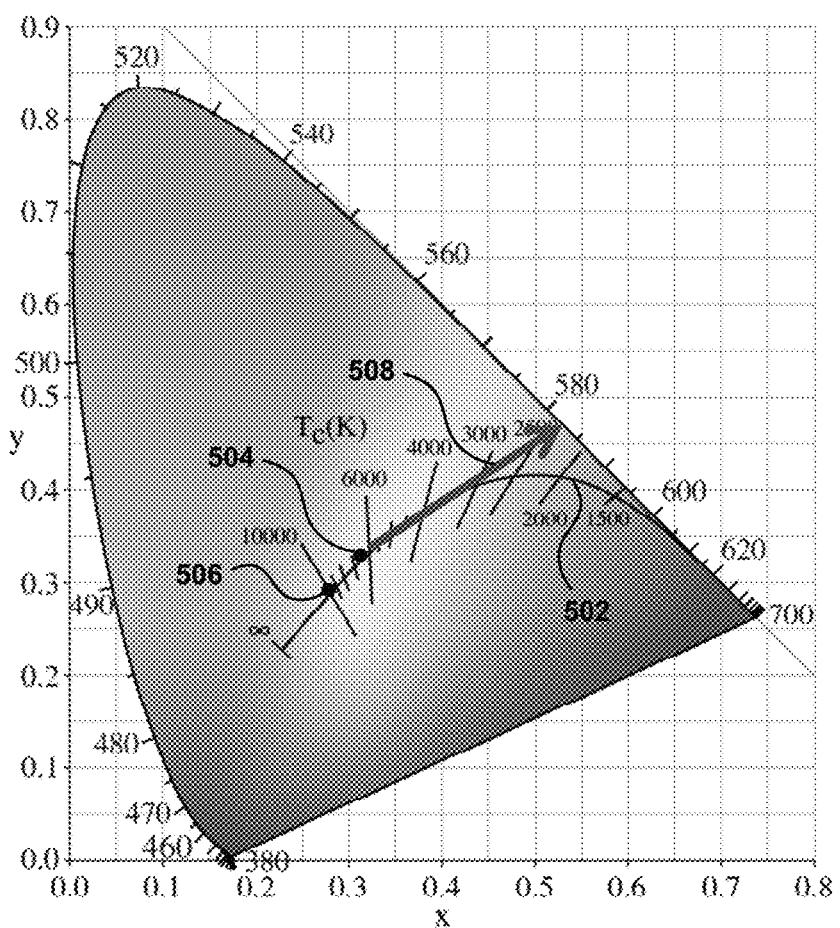
FIG. 5 illustrates an example diagram of a chromaticity map, in accordance with various embodiments.

FIG. 5 illustrates an example diagram 500 of a chromaticity map, in accordance with various embodiments. FIG. 5 illustrates an example of the standard CIE XYZ color space projected directly to the corresponding chromaticity space specified by the two chromaticity coordinates known as x (the horizontal axis) and y (the vertical axis). The Planckian locus 502 is illustrated in FIG. 5, being the path that the color of a black body takes as the black body temperature changes. The point 504 at approximately 6500 K on the Planckian locus 502 represents an example color temperature value of bluish-white light emitted from various LEDs that are commonly used in front-lit displays, and which suffer from the drawbacks and disadvantages discussed earlier. When these LEDs that emit bluish-white light are further filtered, for example by a filter element, then the color temperature value may be increased, for example to the point 506 on the Planckian locus 502, which corresponds to a color temperature value of approximately 10,000 K. While color temperature value is an approximation of color (e.g., blue may be considered in some instances as anything above a color temperature value of approximately 6000 K), a particular wavelength range of the visible light spectrum may be targeted by the techniques described herein. For example, while a "bluish-white" color may be approximated by a color temperature value of approximately 6500 K, a "yellow/yellowish-white" color may not be able to be as closely approximated by color temperature value. As illustrated in FIG. 5, while 2500 K may be an approximation of yellow, because color temperature value may be considered less meaningful when describing yellow/yellowish-white colors, a targeted color of yellow/yellowish-white may lie along the arrow 508 towards the 580-590 nm wavelength, rather than along the curve of the Planckian locus 502. Adjustments to the color of light emitted into the light guide panel, resulting from the techniques described herein, may lie on various points along the arrow 508, and may in some embodiments be approximated by a color temperature value in the example range of 6500 K to 2500 K.

As various embodiments described herein are utilized, the color and/or color temperature value of light directed from the light guide panel onto the display screen moves rightward along the arrow 508, for example as power is proportionately increased to the LEDs providing non-bluish-white light (e.g., filtered LEDs, red and green LEDs, LEDs that emit yellow/yellowish-white light, etc.), and leftward along the arrow 508 as power is proportionately increased to the LEDs that emit bluish-white light, linearly in some embodiments and non-linearly in other embodiments. A rightward movement along the arrow 508 would indicate that the light directed from the light guide panel is cooler in temperature (e.g., having less blue elements).

Figure 6:
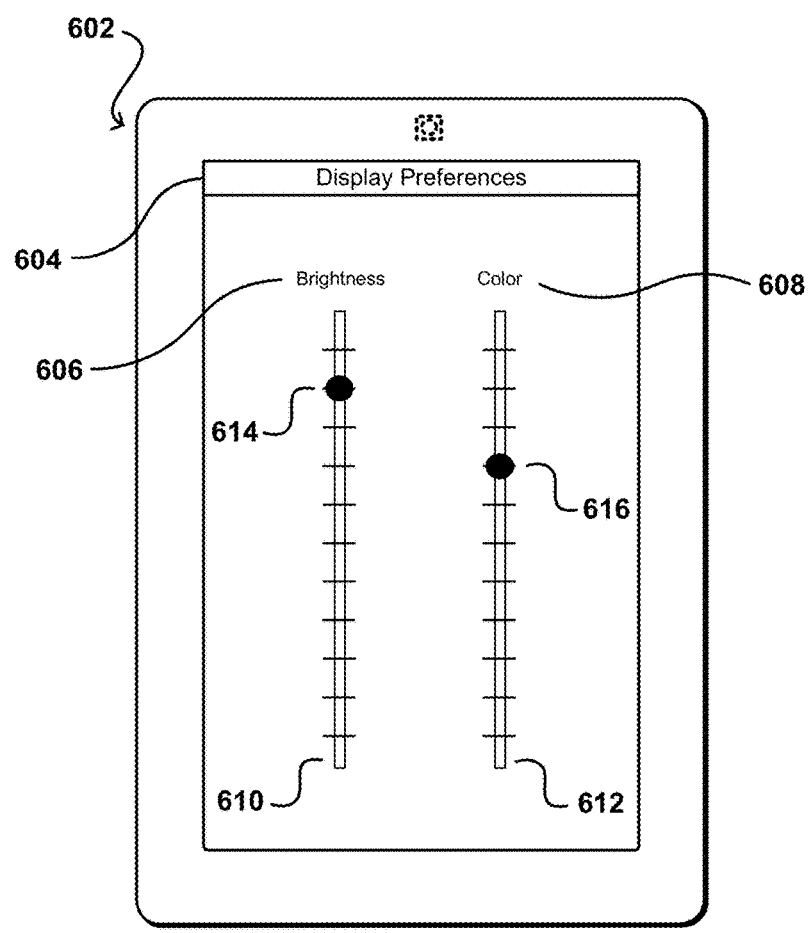
FIG. 6 illustrates an example arrangement of interface elements 600 operable to provide an indication of a desired illumination color, in accordance with various embodiments.

FIG. 6 illustrates an example arrangement of interface elements 600 operable to provide an indication of a desired illumination color, in accordance with various embodiments. In FIG. 6, an example computing device 602 with a display is presented, where an example interface for modifying display preferences 604 of the display is illustrated. According to the example embodiment in FIG. 6, two slider user interface elements 610, 612 are displayed, with one slider 610 corresponding to a desired level of display screen brightness 606 and another slider 612 corresponding to a desired color 608 of the display. Each slider has a selection indicator 614, 616 that is manipulated along the respective slider element 610, 612, with the position of the selection indicator 614, 616 on the respective slider element 610, 612 corresponding to a selection value. FIG. 6 illustrates an example interface embodiment, and additional options relating to display characteristics and/or settings may be provided in alternate embodiments, as well as different types and/or numbers of interface elements.

In the example of FIG. 6, a user manipulates the selection indicators 614, 616, for example with a finger on a touchscreen or a pointing device controlling a cursor, and by dragging the selection indicators 614, 616 to a particular point on the respective slider element 610, 612, provides an indication of a selection of a value for each respective setting. For example, by dragging the "brightness" selection indicator 614 along the "brightness" slider element 610, a brightness level of the display screen may be selected. In some embodiments, various values of the characteristic being modified (e.g., brightness, color, contrast, etc.) may be displayed along the slider elements 610, 612. For example, percentages may be indicated oat various points along the "brightness" slider element 610, such as 0% and 100%, along with various percentages in between. A user could then drag the "brightness" selection indicator 614 along the "brightness" slider element 610 to a particular percentage brightness in order for the device to cause the brightness setting of the display screen to match the selection (e.g., 50% of maximum brightness).

With regard to the "color" slider element 612 in the example of FIG. 6, a user may operate the "color" selection indicator 616 in a similar manner to the "brightness" selection indicator 614; for example, by sliding the "color" selection indicator 616 along the "color" slider element 612, a user may provide an indication of a selection of a particular color of the combined light being emitted from the LEDs into the light guide panel and ultimately towards the display screen, as described earlier herein. According to an embodiment, as the "color" selection indicator 616 moves along the "color" slider element 612, an amount of current distributed by the computing device to the LEDs (e.g., individual LEDs, particular sets and/or subsets of the LEDs, etc.) is modified, as described further herein. For example, the "color" slider element 612 may offer a gamut of colors (e.g., "cool" to "warm", corresponding to bluish-white light to yellow/yellowish-white light) along the arrow 508 illustrated in FIG. 5, corresponding in that example to a bluish-white color light with a color temperature value of approximately 6500 K (although as described earlier, various color temperature values corresponding to bluish-white light may be implemented according to techniques described herein, such as 10,000 K) to a yellow/yellowish-white light with a color temperature value of approximately 2500 K or a wavelength of 580-590 nm.

According to an embodiment, as the "color" selection indicator 616 moves along the "color" slider element 612, a preview of the display color corresponding to a current position of the "color" selection indicator 616 on the "color" slider element 612, may be generated by changing the current directed to various LEDs substantially in real-time, thereby changing the color of the display to reflect the current position of the "color" selection indicator 616.

In various embodiments, and as described more fully herein, a perceived brightness of a display screen is a function of color. For example, in order to keep a perceived brightness of the display screen constant as the "color" selection indicator 616 moves along the "color" slider element 612 (i.e., as the color emitted into the light guide panel changes, such as from bluish-white to yellow), then a current being directed to various LEDs may need to be increased. In various embodiments, the "brightness" selection indicator 614 along the "brightness" slider element 610 may be adjusted as the "color" selection indicator 616 moves along the "color" slider element 612 to reflect the perceived brightness of the display, and offer an approach by which a user manually could adjust the brightness to offset the perceived brightness. For example, as a user changes a display color from bluish-white to yellow, the perceived brightness of the display may decrease to a level that is insufficient for the user to read in a dark room. In some embodiments, the current being delivered to particular LEDs will be automatically adjusted to maintain a substantially stable overall perceived or actual brightness level, while various techniques may provide for the "brightness" selection indicator 614 along the "brightness" slider element 610 to move "downward" (i.e., to a lower portion of the slider element 610 corresponding to a lower brightness level) to provide feedback regarding the lower brightness, and allowing a user to adjust current being delivered to some or all of the LEDs.

Figure 7:
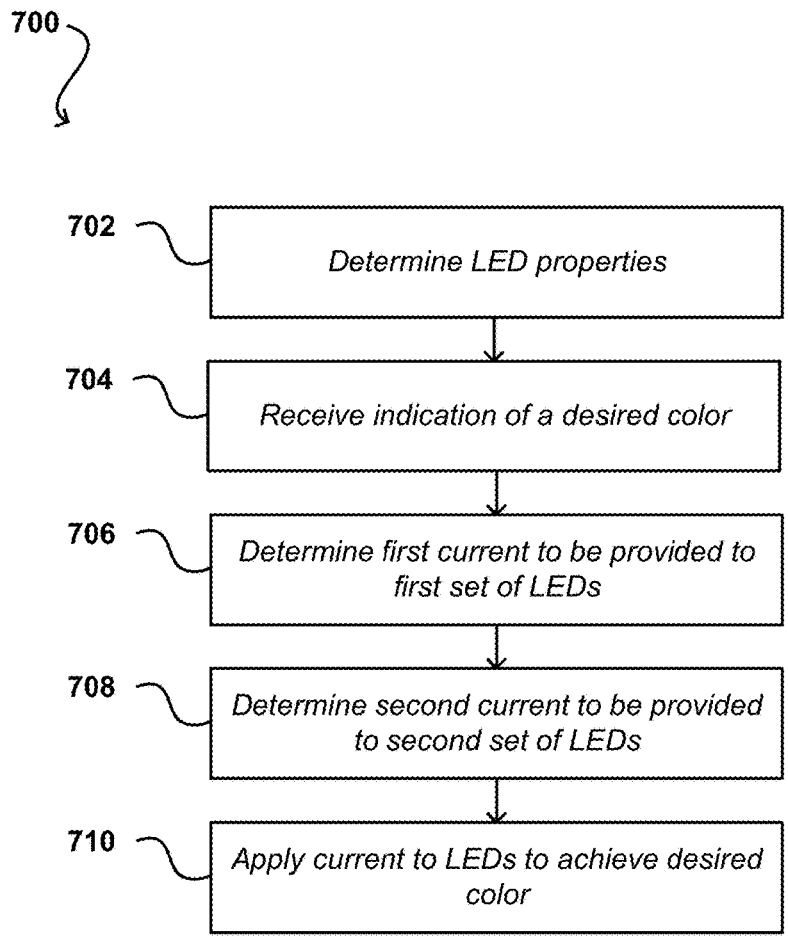
FIG. 7 illustrates an example process for adjustable color temperature illumination, in accordance with various embodiments.

FIG. 7 illustrates an example process 700 for adjustable color temperature illumination, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In accordance with various embodiments, properties of one or more LEDs are determined. For example, various calculations performed as part of determining current to be delivered to sets of LEDs may depend on particular properties of one or more LEDs in the sets of LEDs. As described earlier, perceived brightness is correlated to color, and in order to maintain a substantially constant perceived brightness as the color of light emitted by the LEDs into the light guide panel is adjusted, various embodiments provide determinations made to calculate an amount of current to be delivered to various sets of LEDs. In order to make accurate calculations with regard to the division of current, various properties of the LEDs may be taken into account. For example, the full spectrum response for one or more LEDs of the one or more sets of LEDs may provide data usable as part of calculations that estimate a human eye's brightness response from the one or more LEDs. In some embodiments, the color temperature value of the one or more LEDs may be utilized, which offers a close approximation of the full spectrum response. In other embodiments, a combination of various properties may be utilized. In various embodiments, the properties are determined based on information associated with the one or more LEDs at time of manufacture and/or assembly (e.g. values representing the properties being stored in non-volatile storage in the device), while in other embodiments, a determination of the LED properties is made by the device. For example, as part of a workflow for adjusting display color as described earlier with regard to FIG. 6, the device may determine a full spectrum response of one or more LEDs (e.g., through a built-in sensor, etc.) and utilize the data (e.g., in real-time) to make accurate calculations with regard to amounts of current to be provided to one or more sets of LEDs, as described below.

An indication of a desired color is received 704. For example, a graphical user interface (GUI) element may be provided, an example of which is illustrated in FIG. 6. As discussed with regard to FIG. 6, a user may manipulate the interface element so as to select a desired color of the light being emitted into the light guide panel and directed onto the device display. Feedback may be provided, such as changing the underlying color temperature value of the display in real-time as the user adjusts one or more interface elements (e.g., a color slider corresponding to an overall color of light emitted into the light guide panel, etc.). For example, in the case of a greyscale electrophoretic ink display screen, the display "color" corresponds to the color of light being emitted by the LEDs into the light guide panel, such as from bluish-white to yellow, as described earlier.

In various embodiments, as described herein, there may be one or more sets of LEDs emitting light into the light guide panel and thereby illuminating the display element. For example, there may be a set of LEDs that emit bluish-white light and a set of yellow LEDs. In another example, there may be a set of LEDs that emit bluish-white light of one type and a set of similarly LEDs that emit bluish-white light of another type, with one or both of the sets being filtered, for example to increase the color temperature value of the light emitted by one set (e.g., to make the light more blue) and to decrease the color temperature value of the light emitted by the other set (e.g., to make the light more yellow), with the result being a modification of the color provided to the display (e.g., changing the color from a bluish-white to a yellow/yellowish-white, etc.). As discussed earlier, an indication of a selection of a display color (e.g., more yellowish-white than bluish-white, corresponding to a lower color temperature value than bluish-white) may be received. For example, a slider may be set such that the selected color is 100% bluish-white. According to an embodiment, if one set of LEDs emits bluish-white light and the other set of LEDs emits yellowish-white light, then 100% of the current delivered to the sets of LEDs would be allocated to the set of LEDs that emit bluish-white light. Similarly, if the slider is set to 100% yellowish-white, and one set of LEDs emitted bluish-white light and the other set of LEDs emitted yellowish-white light, then 100% of the current delivered to the sets of LEDs would be allocated to the set of LEDs that emit yellowish-white light.

Figure 8:
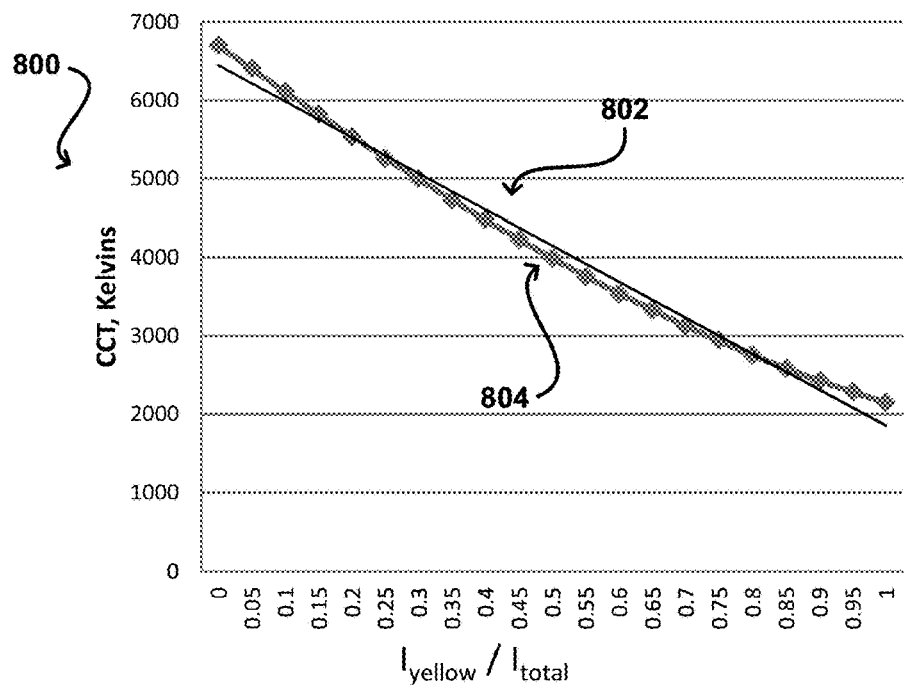
FIG. 8 illustrates an example graph of a relationship of CCT to a fraction of current supplied to yellow LEDs, in accordance with various embodiments.

In various embodiments, a determination of current to be delivered to one or more sets of LEDs may take into account various factors such as properties of the one or more sets of LEDs, as described earlier, as well as a determination of a correlated color temperature (CCT) as it relates to an amount of current being delivered to LEDs that provide yellowish-white light, either inherently or as the result of a filter element. For example, and as described with regard to FIG. 8, given two sets of LEDs (e.g., a set emitting bluish-white light and a set emitting yellowish-white light, either as a result of inherent characteristics of the LEDs or use of filter elements) the CCT of light emitted into a light guide panel by the LEDs and directed onto a display decreases as a fraction of the overall current being provided to the set of LEDs emitting yellowish-white light increases. For example, as a user manipulates an interface element to provide an indication of a selection of a display color that is more yellowish-white, a determination may be made to increase a portion of overall current delivered to the set of LEDs emitting yellowish-white light so that the overall CCT of the light being emitted by the LEDs substantially matches the selected color, for example utilizing a calculation taking various factors into account, such as the spectrum response for one or more LEDs, etc.

Figure 9:
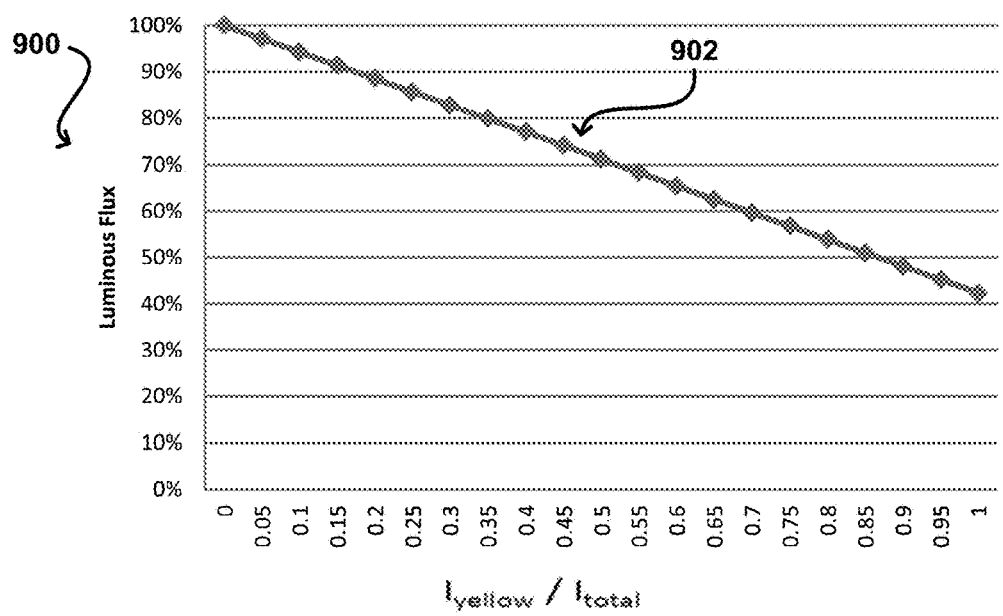
FIG. 9 illustrates an example graph of a relationship of lumens output to a fraction of current supplied to yellow LEDs, in accordance with various embodiments.

According to another embodiment, a determination of current to be delivered to one or more sets of LEDs may take into account a determination of lumens output as it relates to an amount of current being delivered to LEDs that provide yellowish-white light, either inherently or as the result of a filter element. For example, and as described with regard to FIG. 9, given two sets of LEDs (e.g., a set emitting bluish-white light and a set emitting yellowish-white light, either as a result of inherent characteristics of the LEDs or use of filter elements), the overall lumens output of the LEDs decreases as a fraction of the overall current being provided to the set of LEDs emitting yellowish-white light increases. Also, in order to maintain a constant lumens output (i.e., to keep the overall brightness of the display constant) as the CCT of light being provided to a display is reduced, then an increase in the relative total current being delivered to the LEDs may be required, as described more fully with regard to FIG. 10. For example, as a user manipulates an interface element to provide an indication of a selection of a display color that is more yellowish-white, then a determination of current that maintains a constant lumens output (i.e., brightness) is made. This determination may take into account one or more of the factors described above.

In various embodiments, the above determinations, along with data such as the full spectrum response of one or more LEDs, is taken into account in making a determination of current that is to be delivered to one set of LEDs 704, such as a set of LEDs emitting bluish-white light, and in making a determination of current that is to be delivered to another set of LEDs 706, such as a set of LEDs emitting yellowish-white light. According to an embodiment, as discussed earlier, because perceived brightness is a function of color, in order to determine an amount of current going to a set of LEDs that emit bluish-white light and a set of LEDs that emit yellowish-white light when the desired color of a display is selected to be more yellow and in order to maintain a substantially constant brightness of the display, a determination is made beyond reducing the current going to the LEDs that emit bluish-white light by a certain amount and increasing current going to the LEDs that emit yellowish-white light by a corresponding amount. Rather, in order to maintain a substantially constant level of brightness (e.g., as selected by a user), then a determination of an amount of current (e.g., going to each set of LEDs individually and to the LEDs overall) is made, as described above. As a hypothetical example, if 20 milliamps (mA) of current is provided to a set of LEDs that emit bluish-white light, then it may result in a total brightness (e.g., lumen output) of 100 "units" of brightness. If the same 20 mA is provided to a set of LEDs that emit yellowish-white light, then it may result in only 50 "units" of total brightness. In various embodiments, in order to determine current to be provided to sets of LEDs in order to generate a particular CCT of the display while maintaining a threshold level of brightness (e.g., as set by a user), then a determination of a total current and a distribution of that total current is made (e.g., substantially in real time) as the selected CCT is modified. In another hypothetical example, knowing an idealized spectrum response from a set of LEDs that emit bluish-white light, with one set being unfiltered and another set being filtered to produce yellowish-white light, assuming drive current is linear, in order to maintain a substantially constant brightness level, the yellowish-white set requires 3 "units" of current as opposed to 2 "units" for the bluish-white set. If the current to the bluish-white set of LEDs is reduced by 1 "unit," for example to change the overall color temperature value of a display, then the current to the LEDs that emit yellowish-white light should be increased by 2 "units" to maintain the selected brightness. The specific calculations required for various embodiments is dependent upon various factors, such as characteristics and/or properties of the individual LEDs, power supply, display response, etc.

Once an amount current to be applied to each set (or subset) of LEDs has been determined (e.g., independently or otherwise), then the current is applied 710 in order to cause the light emitted by the respective LEDs to have a different color temperature value, which when combined in the light guide panel, results in the combined temperature of the light directed onto the display screen approximately matching the desired color temperature value.

FIG. 8 illustrates an example graph 800 of a relationship of CCT to a fraction of current supplied to yellow LEDs, in accordance with various embodiments. For example, given two sets of LEDs (e.g., a set emitting bluish-white light and a set emitting yellowish-white light, either as a result of inherent characteristics of the LEDs or use of filter elements), the CCT of light emitted into a light guide panel by the LEDs (the vertical axis) and reflected onto a display decreases smoothly 804 as a fraction of the overall current being provided to the set of LEDs emitting yellowish-white light (the horizontal axis) increases. A trend line 802 demonstrates the approximate slope of the decrease in CCT as current to the set of LEDs emitting yellowish-white light increases. As illustrated by the example graph 800, the CCT range of light emitted by a combination of LEDs that emit bluish-white light and LEDs that emit yellowish-white light ranges from approximately 6500 K to approximately 2500 K, depending on the relative current being delivered to each set of LEDs. This range is further dependent upon other factors, such as the presence of additional filters on the LEDs that emit bluish-white light that result in an increase in the color temperature value of the light emitted into the light guide panel by the LEDs that emit bluish-white light. Other factors may include the full spectrum response of the LEDs in one or both sets of LEDs, as well as other properties of the LEDs.

FIG. 9 illustrates an example graph 900 of a relationship of lumens output to a fraction of current supplied to yellow LEDs, in accordance with various embodiments. For example, given two sets of LEDs (e.g., a set emitting bluish-white light and a set emitting yellowish-white light, either as a result of inherent characteristics of the LEDs or use of filter elements), the lumens output of light emitted into a light guide panel by the LEDs (the vertical axis) and reflected onto a display decreases linearly 902 as a fraction of the overall current being provided to the set of LEDs emitting yellowish-white light (the horizontal axis) increases, assuming constant total current. This illustrates that in order to maintain substantially constant brightness of the light emitted into the light guide panel as reflected onto the display as the overall color of the light (i.e., the CCT) changes (e.g., as a result of decreasing current to the set of LEDs emitting bluish-white light and increasing current to the set of LEDs emitting yellowish-white light), then the current to the set of LEDs emitting yellowish-white light should be increased by an amount determined by various factors, such as the full spectrum response of the LEDs in one or both sets of LEDs, as well as other properties of the LEDs.

Figure 10:
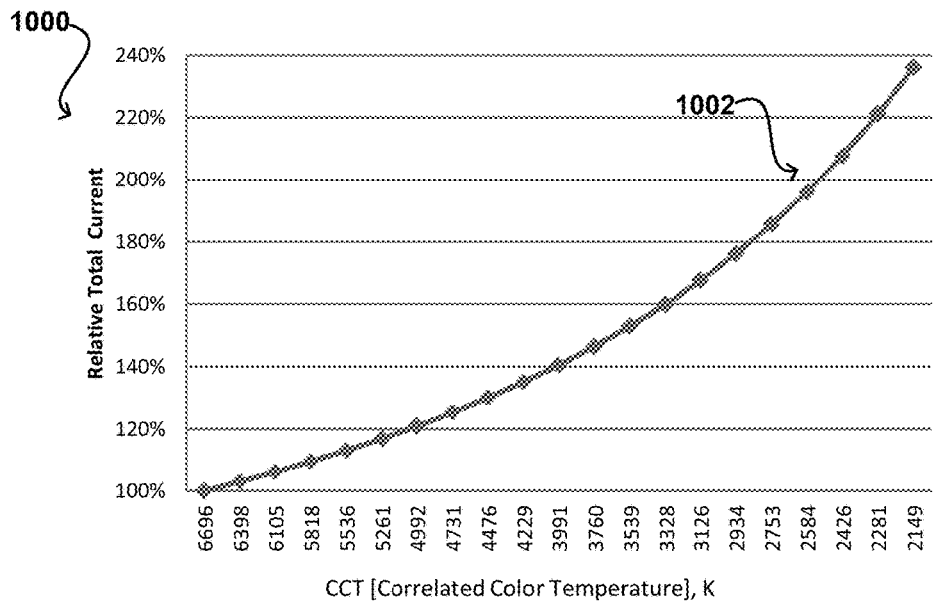
FIG. 10 illustrates an example graph of a relationship of CCT to total current supplied to LEDs, in accordance with various embodiments.

FIG. 10 illustrates an example graph 1000 of a relationship of CCT to total current supplied to LEDs, in accordance with various embodiments. For example, given two sets of LEDs (e.g., a set emitting bluish-white light and a set emitting yellowish-white light, either as a result of inherent characteristics of the LEDs or use of filter elements), as the CCT of the light decreases, a corresponding increase 1002 in the total current is required in order to maintain a constant lumen output (i.e., a constant brightness, such as that selected by a user). According to various embodiments, as determinations are made regarding current to be delivered to varying sets of LEDs, a determination of total current is also made in the event that overall brightness (i.e., lumen output) is desired to be held substantially constant.

Figure 11:
FIG. 11 illustrates an example graph of the relative spectra of LEDs that emit bluish-white light with and without a yellow filter, in accordance with various embodiments.

FIG. 11 illustrates an example graph of the relative spectra of LEDs that emit bluish-white light with and without a yellow filter, in accordance with various embodiments. For example, given two sets of LEDs (e.g., an unfiltered set emitting bluish-white light (e.g., LEDs with a yttrium aluminum garnet (YAG) phosphor, etc.) and a set emitting yellowish-white light (e.g., the same LEDs utilizing a yellow filter), then the relative luminous intensity (the vertical axis) of the unfiltered LEDs that emit bluish-white light is higher than the relative luminous intensity of the filtered LEDs at virtually every wavelength, including the target 580-590 nm range described earlier with regard to various embodiments. Because of this relationship, determinations are made in various embodiments where the overall wavelength of the emitted light is a particular value and the relative luminous intensity of the light is desired to be held substantially constant.

Figure 12:
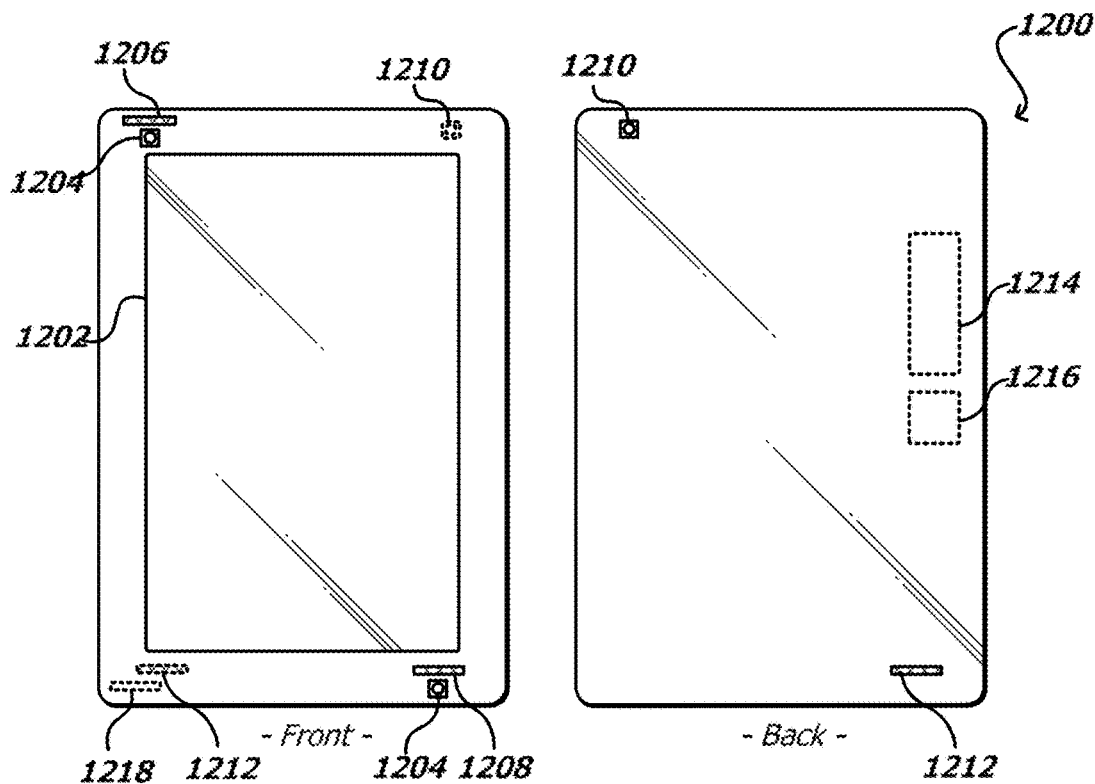
FIG. 12 illustrates front and back views of an example portable computing device that can be used in accordance with various embodiments.

FIG. 12 illustrates front and back views of an example electronic computing device 1200 that can be used in accordance with various embodiments, for example, a mobile device configured for adjustable color temperature illumination using the techniques described herein. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1200 has a display screen 1202 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 1204 on the front of the device and at least one image capture element 1210 on the back of the device. It should be understood, however, that image capture elements could also, or alternatively, be placed on the sides or corners of the device, and that there can be any appropriate number of capture elements of similar or different types. Each image capture element 1204 and 1210 may be, for example, a camera, a charge-coupled device (CCD), a motion detection sensor or an infrared sensor, or other image capturing technology.

As discussed, the device can use the images (e.g., still or video) captured from the imaging elements 1204 and 1210 to generate a three-dimensional simulation of the surrounding environment (e.g., a virtual reality of the surrounding environment for display on the display element of the device). Further, the device can utilize outputs from at least one of the image capture elements 1204 and 1210 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1208 on the front side, one microphone 1212 on the back, and one microphone 1206 on or near a top or side of the device. In some devices there may be only one microphone, while in other devices there might be at least one microphone on each side and/or corner of the device, or in other appropriate locations.

The device 1200 in this example also includes one or more orientation- or position-determining elements 1218 operable to provide information such as a position, direction, motion, or orientation of the device. These elements can include, for example, accelerometers, inertial sensors, electronic gyroscopes, and electronic compasses.

The example device also includes at least one communication mechanism 1214, such as may include at least one wired or wireless component operable to communicate with one or more electronic devices. The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

Figure 13:
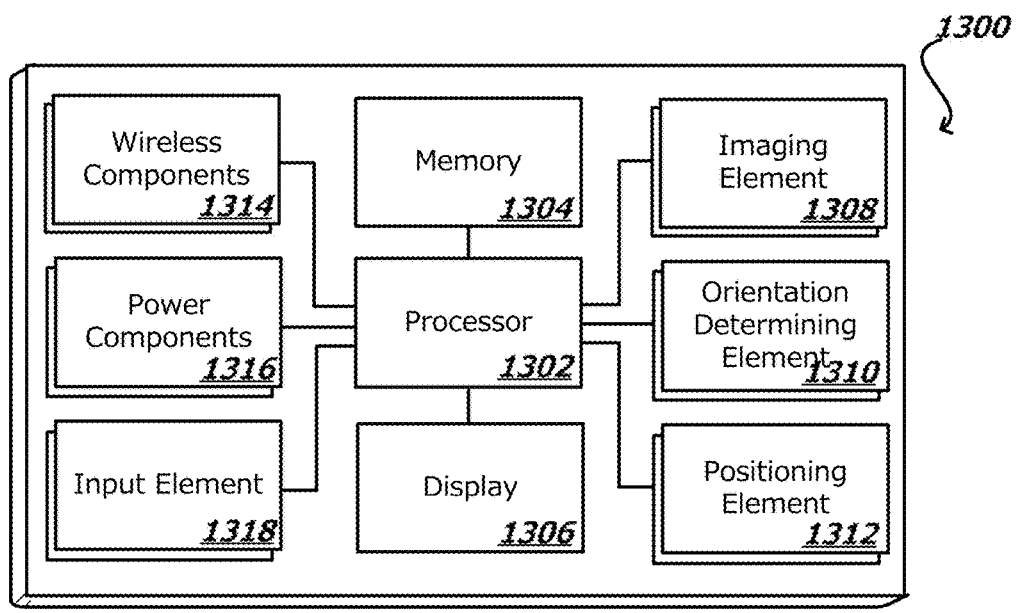
FIG. 13 illustrates an example set of basic components of a portable computing device, such as the device described with respect to FIG. 12.

FIG. 13 illustrates a set of basic components of an electronic computing device 1300 such as the device 1200 described with respect to FIG. 12. In this example, the device includes at least one processing unit 1302 for executing instructions that can be stored in a memory device or element 1304. As would be apparent to one of ordinary skill in the art, the device can include many types of memory, data storage, or computer-readable media, such as a first data storage for program instructions for execution by the processing unit(s) 1302, the same or separate storage can be used for images or data, a removable memory can be available for sharing information with other devices, and any number of communication approaches can be available for sharing with other devices.

The device typically will include some type of display element 1306, such as a touch screen, electrophoretic ink displays, organic light emitting diode (OLED) or liquid crystal display (LCD), although devices such as portable media players might convey information via other means, such as through audio speakers.

As discussed, the device in many embodiments will include at least one imaging element 1308, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1300 also includes at least one orientation determining element 1310 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1300. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1312 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1314 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1316, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1318 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc.

A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 14:
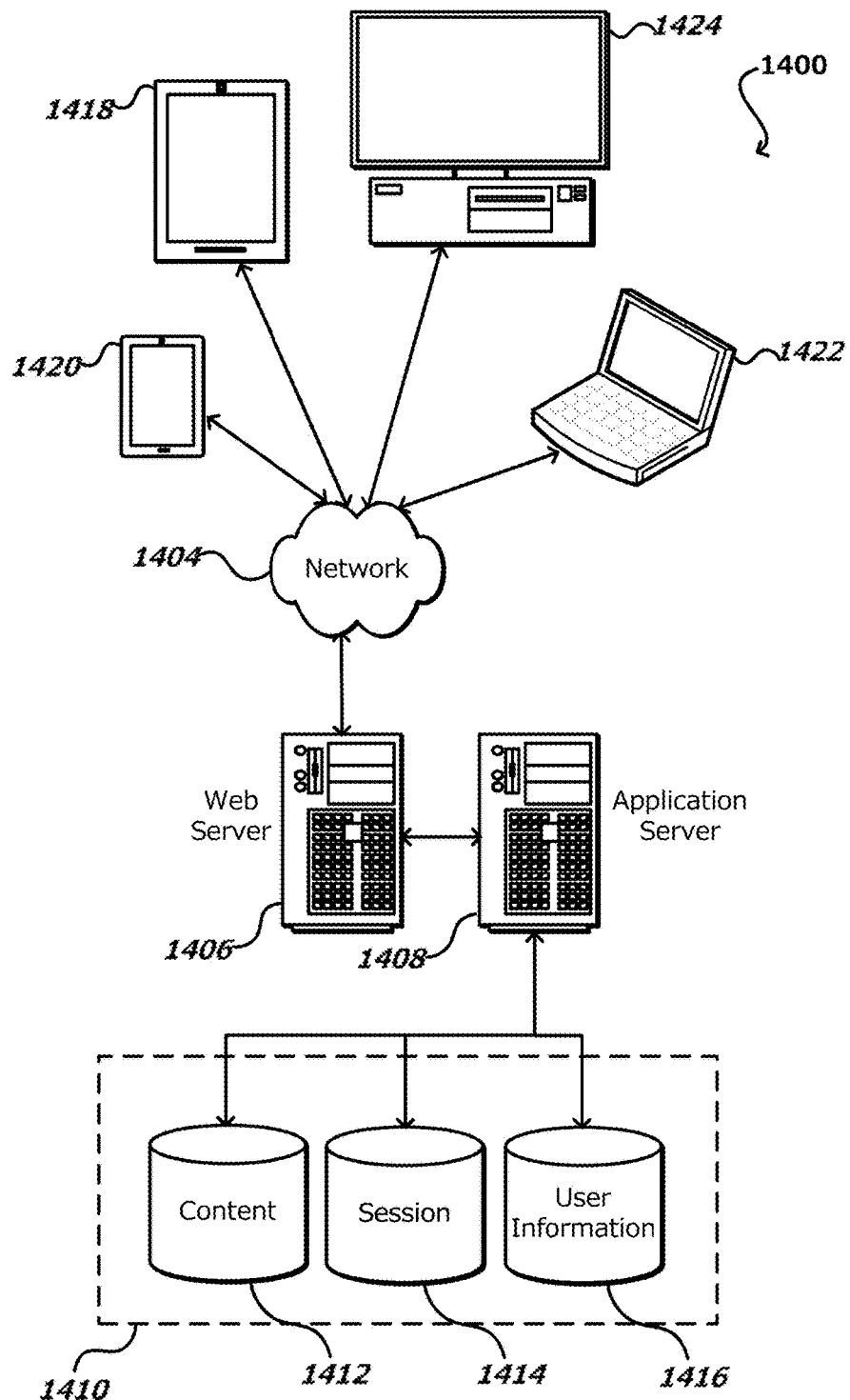
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes electronic client devices 1418, 1420, 1422, and 1424, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the client devices 1418, 1420, 1422, and 1424 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1418, 1420, 1422 and 1424. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Various systems, devices, methods, and approaches described herein may be implemented on one or more general-purpose and/or specific computing devices, such as under the control of one or more computer systems configured with executable instructions, the computer systems for example having one or more processors which may be communicatively coupled to other components such as one or more memory units that may store the instructions for execution. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   an electrophoretic display screen;
   a light guide panel operable to receive light that is subsequently directed towards the electrophoretic ink display screen;
   a first plurality of light emitting diodes (LEDs) positioned at an edge of the light guide panel, the first plurality of LEDs emitting bluish-white light having a first color temperature value into the light guide panel;
   a second plurality of LEDs positioned at the edge of the light guide panel, the second plurality of LEDs emitting yellowish-white light having a second color temperature value lower than the first color temperature value into the light guide panel,
   wherein the electrophoretic display screen receives the bluish-white light and the yellowish-white light as combined light, and a color temperature value of the combined light is higher than the first color temperature value and lower than the second color temperature value; and
   at least one processor and a memory including instructions that, when executed by the at least one processor, cause the computing device to:
      determine an initial color temperature and an initial brightness;
      receive input comprising an indication of a selected color temperature value; and
      determine a first current to the first plurality of LEDs and a second current to the second plurality of LEDs, such that the color temperature value of the combined light is substantially equal to the selected color temperature value and a brightness of the combined light is substantially equal to the initial brightness, wherein the first current and the second current are controlled independently and compensate for a brightness response difference between the initial color temperature and the selected color temperature.

2. The computing device of claim 1, further comprising:
   a first optical filter element positioned between at least one LED of the second plurality of LEDs and the light guide panel, the first optical filter element being configured to block light having a wavelength between 450 nm and 495 nm emitted by the at least one LED of the second plurality of LEDs.

3. The computing device of claim 2, further comprising:
   a second optical filter element positioned between each LED of the first plurality of LEDs and the light guide panel, the second optical filter element being configured to block light having a wavelength less than 450 nm and more than 490 nm emitted by the first plurality of LEDs, resulting in filtered light,
   wherein the color temperature value of the filtered light is approximately 10,000 Kelvin (K).

4. The computing device of claim 3, wherein each LED of the first plurality of LEDs is positioned at the edge of the light guide panel in a first interleaved pattern with each LED of the second plurality of LEDs, and
   wherein the first optical filter element comprises a plurality of first optical filter elements, the second optical filter element comprises a plurality of second optical filter elements, and each of the first optical filter elements and the second optical filter elements are positioned on a single filter strip in a second interleaved pattern matching the first interleaved pattern.

5. A computing device, comprising:
   a display screen;
   a light guide panel coupled to the display screen;
   a first set of illuminating elements positioned at an edge of the light guide panel, the first set of illuminating elements operable to direct first light having a first color temperature into the light guide panel;
   a second set of illuminating elements positioned at the edge of the light guide panel, the second set of illuminating elements operable to direct second light having a second color temperature into the light guide panel, wherein the first light and the second light are combined in the light guide panel resulting in a combined light;
   a first filter element positioned between at least one illuminating element of the second set of illuminating elements and the light guide panel, the first filter element operable to block at least a portion of light in the second light having a wavelength between 450 nm and 495 nm from being directed to the light guide panel;
   a first current controlling element to provide a first current to the first set of illuminating elements, the first current causing the first light to have the first color temperature value;
   a second current controlling element to provide a second current to the second set of illuminating elements, the second current causing the second light to have the second color temperature value, the first current controlling element controllable independently from the second current controlling element; and
   at least one processor and memory including instructions that when executed by the at least one processor, cause the computing device to:

determine an initial combined temperature value and an initial combined brightness value for the combined light;

determine a target combined temperature value for the combined light; and determine, using a brightness response metric, an adjusted value for the first current and an adjusted value for the second current resulting in combined light having the target combined temperature value and the initial brightness value.

6. The device of claim 5, wherein the first set of illuminating elements includes a first plurality of light emitting diodes (LEDs) emitting bluish-white light, and the second set of illuminating elements includes a second plurality of LEDs emitting yellowish-white light.

7. The device of claim 6, wherein each of the LEDs emitting yellowish-white light is positioned at the edge of the light guide panel between two of the LEDs emitting bluish-white light.

8. The device of claim 5, further comprising:
a third set of illuminating elements positioned at the edge of the light guide panel, the third set of illuminating elements operable to direct fourth light into the light guide panel,
wherein the second set of illuminating elements includes a plurality of red-light emitting LEDs and the third set of illuminating elements includes a plurality of green-light emitting LEDs.

9. The device of claim 8, wherein the first set of illuminating elements, the second set of illuminating elements, and the third set of illuminating elements are arranged at the edge of the light guide panel in a pattern wherein a red-light emitting LED is positioned immediately adjacent to a green-light emitting LED, the red-light emitting LED and the green-light emitting LED are together positioned between two illuminating elements LEDs of the first set of illuminating elements.

10. The device of claim 5, wherein the first light has a first color temperature value of approximately 6,500 Kelvin (K), and wherein the first filter element comprises a long bandpass absorption filter configured to block light having a wavelength between 450 nm and 495 nm in the second light, causing the second light to have a second color temperature value, the second color temperature value being lower than the first color temperature value.

11. The device of claim 10, wherein the first light and the second light is combined in the light guide panel to form third light, the third light having a third color temperature value between the first color temperature value and the second color temperature value.

12. The device of claim 5, further comprising:
a second filter element positioned between at least one illuminating element of the first set of illuminating elements and the light guide panel, the second filter element operable to block light having a wavelength less than 450 nm and more than 490 nm from the at least one illuminating element into the light guide panel,
wherein a color temperature value of the first light radiated through the second filter element into the light guide panel is approximately 10,000 K.

13. The device of claim 12, further comprising:
a filter strip attached to the edge of the light guide panel, the filter strip having a plurality of first filter elements and a plurality of second filter elements positioned thereon in an interleaved pattern, such that one first filter element is positioned between each illuminating element of the second set of illuminating elements and the light guide panel and one second filter element is positioned between each illuminating element of the first set of illuminating elements and the light guide panel.

14. The device of claim 12, further comprising:
a first filter strip attached to the edge of the light guide panel, the first filter strip having a plurality of first filter elements positioned thereon such that one first filter element is positioned between each illuminating element of the second set of illuminating elements and the light guide panel; and
a second filter strip attached to an exit surface of the first and second set of illuminating elements, the second filter strip having a plurality of second filter elements positioned thereon such that one second filter element is positioned between each illuminating element of the first set of illuminating elements and the light guide panel, and having no filter element between each illuminating element of the second set of illuminating elements and the light guide panel.

15. The device of claim 5, further comprising:
a filter strip attached to the edge of the light guide panel, the filter strip having a plurality of first filter elements positioned thereon such that one first filter element is positioned between each illuminating element of the second set of illuminating elements and the light guide panel,
wherein at least one of the first filter elements comprises a long bandpass absorption filter.

16. A method, comprising:
arranging a first set of illuminating elements at an edge of a light guide panel, the first set of illuminating elements operable to direct first light into the light guide panel;
arranging a second set of illuminating elements at the edge of the light guide panel, the second set of illuminating elements operable to direct second light into the light guide panel, wherein the first light and the second light are combined in the light guide panel resulting in a combined light;
positioning a first filter element between at least one illuminating element of the second set of illuminating elements and the light guide panel, the first filter element operable to block at least a portion of light in the second light having a wavelength between 450 nm and 495 nm from being directed into the light guide panel;
providing a first current to the first set of illuminating elements, the first current causing the first light to have a first color temperature value; and
providing a second current to the second set of illuminating elements, the second current causing the second light to have a second color temperature value, the first current and the second current being independently controlled to produce a determined combined light temperature and a determined combined light brightness based on a brightness response for the determined combined light temperature.

17. The method of claim 16, further comprising:
arranging a third set of illuminating elements at the edge of the light guide panel, the third set of illuminating elements operable to emit third light into the light guide panel,
wherein the second set of illuminating elements includes a plurality of light emitting diodes (LEDs) emitting red light and the third set of illuminating elements includes a plurality of green-light emitting LEDs.

18. The method of claim 16, wherein the first light has a first color temperature value of approximately 6,500 Kelvin (K), and wherein the first filter element comprises a long bandpass absorption filter configured to block at least a portion of light in the second light having a wavelength between 450 nm and 495 nm in the second light, causing the second light to have a second color temperature value, the second color temperature value being lower than the first color temperature value.

* * * * *